US009344232B2

(12) United States Patent
Kenney et al.

(10) Patent No.: US 9,344,232 B2
(45) Date of Patent: *May 17, 2016

(54) MOBILE DEVICE AND METHOD FOR MULTIPLE BANDWIDTH OPERATION WITH TONE COUNT SELECTION

(71) Applicant: Intel Corporation, Santa Clara, CA (US)

(72) Inventors: Thomas J. Kenney, Portland, OR (US); Eldad Perahia, Portland, OR (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,924

(22) Filed: Feb. 25, 2015

(65) Prior Publication Data

US 2015/0172013 A1 Jun. 18, 2015

Related U.S. Application Data

(60) Continuation of application No. 13/136,523, filed on Aug. 3, 2011, now Pat. No. 8,982,970, which is a division of application No. 12/655,051, filed on Dec. 22, 2009, now Pat. No. 8,396,150.

(51) Int. Cl.
*H04L 27/28* (2006.01)
*H04L 5/00* (2006.01)
(Continued)

(52) U.S. Cl.
CPC ............ *H04L 5/0007* (2013.01); *H04L 1/0003* (2013.01); *H04L 1/0009* (2013.01); *H04L 27/2602* (2013.01); *H04L 27/2626* (2013.01); *H04L 27/2698* (2013.01); *H04L 1/0041* (2013.01); *H04L 1/0071* (2013.01); *H04L 1/0075* (2013.01); *H04L 5/0048* (2013.01); *H04L 27/2601* (2013.01)

(58) Field of Classification Search
CPC ........... H04L 27/2602; H04L 27/2608; H04L 5/0044; H04L 1/0071; H04L 5/0023; H04L 27/2613; H04W 84/12; H04B 7/0452
USPC ........................ 375/260, 261, 295, 298, 316
See application file for complete search history.

(56) References Cited

U.S. PATENT DOCUMENTS 7,170,849 B1 1/2007 Arivoli et al.
8,396,150 B2 3/2013 Kenney et al.
(Continued)

FOREIGN PATENT DOCUMENTS

CN 1839574 A 9/2006
CN 101263667 A 9/2008
(Continued)

OTHER PUBLICATIONS

U.S. Appl. No. 12/655,051, Non Final Office Action mailed May 23, 2012, 12 pgs.
(Continued)

*Primary Examiner* — David S Huang
(74) *Attorney, Agent, or Firm* — Schwegman Lundberg & Woessner, P.A.

(57) ABSTRACT

In a device or system, a total tone count is determined or selected for modulating a data payload. Two or more code words are interleaved into the data payload, and the data payload is transmitted on a channel of the device or system.

23 Claims, 5 Drawing Sheets

(51) Int. Cl.
*H04L 1/00* (2006.01)
*H04L 27/26* (2006.01)

(56) References Cited

U.S. PATENT DOCUMENTS

| | | | |
|---|---|---|---|
| 8,619,814 B2 | 12/2013 | Seok | |
| 8,982,970 B2* | 3/2015 | Kenney et al. | ........... 375/260 |
| 2005/0152473 A1 | 7/2005 | Maltsev et al. | |
| 2007/0153833 A1 | 7/2007 | Chang et al. | |
| 2007/0230594 A1 | 10/2007 | Mo et al. | |
| 2008/0175189 A1 | 7/2008 | Furrer et al. | |
| 2008/0298510 A1 | 12/2008 | Jonsson | |
| 2009/0304097 A1 | 12/2009 | Han et al. | |
| 2009/0322621 A1 | 12/2009 | Inanoglu et al. | |
| 2011/0026623 A1 | 2/2011 | Srinivasa et al. | |
| 2011/0131464 A1 | 6/2011 | Ko et al. | |
| 2011/0293029 A1 | 12/2011 | Kenney et al. | |
| 2012/0099667 A1* | 4/2012 | Hansen | ...................... 375/261 |

FOREIGN PATENT DOCUMENTS

| | | |
|---|---|---|
| CN | 101263668 A | 8/2010 |
| CN | 102227112 A | 10/2011 |
| EP | 2517428 A2 | 10/2012 |
| JP | 2003101499 A | 4/2003 |
| JP | 2008508816 A | 3/2008 |
| JP | 2008245331 A | 10/2008 |
| JP | 2009505511 A | 2/2009 |
| JP | 2009520436 A | 5/2009 |
| JP | 2009246501 A | 10/2009 |
| JP | 2013513297 A | 4/2013 |
| WO | WO-2004015948 A1 | 2/2004 |
| WO | WO-2006015270 A1 | 2/2006 |
| WO | WO-2008093945 A2 | 8/2008 |
| WO | WO-2011087559 A2 | 7/2011 |
| WO | WO-2011087559 A3 | 7/2011 |

OTHER PUBLICATIONS

U.S. Appl. No. 12/655,051, Notice of Allowance mailed Sep. 19, 2012, 9 pgs.
U.S. Appl. No. 12/655,051, Notice of Allowance mailed Oct. 25, 2012, 10 pgs.
U.S. Appl. No. 12/655,051, Response filed Aug. 23, 2012 to Non Final Office Action mailed May 23, 2012, 12 pgs.
U.S. Appl. No. 13/136,523, Advisory Action mailed Apr. 18, 2013, 3 pgs.
U.S. Appl. No. 13/136,523, Final Office Action mailed Feb. 15, 2013, 10 pgs.
U.S. Appl. No. 13/136,523, Final Office Action mailed Sep. 23, 2014, 11 pgs.
U.S. Appl. No. 13/136,523, Non Final Office Action mailed Feb. 27, 2014, 11 pgs.
U.S. Appl. No. 13/136,523, Non Final Office Action mailed May 22, 2012, 15 pgs.
U.S. Appl. No. 13/136,523, Notice of Allowance mailed Nov. 6, 2014, 8 pgs.
U.S. Appl. No. 13/136,523, Preliminary Amendment filed Dec. 27, 2011, 6 pgs.
U.S. Appl. No. 13/136,523, Response filed Apr. 15, 2013 to Final Office Action mailed Feb. 15, 2013, 8 pgs.
U.S. Appl. No. 13/136,523, Response filed May 27, 2014 to Non Final Office Action mailed Feb. 27, 2014, 10 pgs.
U.S. Appl. No. 13/136,523, Response filed Oct. 9, 2014 to Final Office Action dated Sep. 23, 2014, 9 pgs.
U.S. Appl. No. 13/136,523, Response filed Oct. 22, 2012 to Non Final Office Action mailed May 22, 2012, 17 pgs.
Chinese Application Serial No. 201010619570.0, Office Action mailed Mar. 27, 2014, w/English translation, 12 pgs.
Chinese Application Serial No. 201010619570.0, Office Action mailed Jul. 2, 2013, w/English translation, 11 pgs.
Chinese Application Serial No. 201010619570.0, Office Action mailed Oct. 15, 2014, W/ English Translation, 7 pgs.
Chinese Application Serial No. 201010619570.0, Response filed Nov. 14, 2013 to Office Action mailed Jul. 2, 2013, w/English claims, 22 pgs.
Chinese Application Serial No. 201010619570.0, Response filed Dec. 30, 2014 to Office Action mailed Oct. 15, 2014, W/ English Claims, 22 pgs.
European Application Serial No. 10843404.4, Office Action mailed Aug. 22, 2012, 2 pgs.
European Application Serial No. 10843404.4, Amendment filed Feb. 22, 2013, 5 pgs.
"HT PHY Specification", Enhanced Wireless Consortium, V1.27, (Dec. 23, 2005).
International Application Serial No. PCT/US2010/056202, International Preliminary Report on Patentability mailed Jul. 5, 2012, 6 pgs.
International Application Serial No. PCT/US2010/056202, International Search Report mailed Jul. 28, 2011, 3 pgs.
International Application Serial No. PCT/US2010/056202, Written Opinion mailed Jul. 28, 2011, 4 pgs.
Japanese Application Serial No. 2012-542036, Amendment filed Dec. 17, 2012, w/English claims, 21 pgs.
Japanese Application Serial No. 2012-542036, Examiners Decision of Final Rejection mailed Oct. 28, 2014, W/ English Translation, 6 pgs.
Japanese Application Serial No. 2012-542036, Office Action mailed Apr. 8, 2014, w/English translation, 4 pgs.
Japanese Application Serial No. 2012-542036, Office Action mailed Dec. 3, 2013, w/English translation, 4 pgs.
Japanese Application Serial No. 2012-542036, Response filed Mar. 3, 2013 to Office Action mailed Dec. 3, 2013, w/English claims, 11 pgs.
Japanese Application Serial No. 2012-542036, Response filed Jun. 16, 2014 to Office Action mailed Apr. 8, 2014, W/ English Claims, 11 pgs.
Ramadurai, Vaidyanathan, et al., "Software Implementation of 802. 11a blocks on Sandblaster DSP", Proceedings of Software Defined Radio Technical Forum (SDR Forum '06),, [Online]. Retrieved from the Internet: <http://www.glossner.org/john/>, (Nov. 2006), 5 pgs.
Chinese Application Serial No. 201010619570.0, Office Action mailed Dec. 10, 2015, W/ English Translation, 17 pgs.
"IEEE Std", IEEE Std 802.11n-2009, (Oct. 29, 2009), 261-267, 293-296, 301-302.
Japanese Application Serial No. 2015-037546, Office Action mailed Jan. 5, 2016, W/ English Translation, 9 pgs.
Nee, Richard Van, "Strawmodel 802.11ac Specification Framework", doc.:IEEE 802.11-09/0633r0, [Online] retrieved from the internet: <https://mentor.ieee.org./802.11/dcn/09/11-09-0633-00-00ac-strawmodel-802-11ac-specification-framework.pptx)>, (May 14, 2009), 1-30.

* cited by examiner

```
function [Ncbps, Ndbps, cnt] = FindCombinations()

% Possible configurations
FFTsize = 256;

% Variables
% Modtype is modulation order 1= bsps, 2=qpsk, 4=16QAM, 6= 64 QAM, 8 = 256QAM
and 10= 1024
Modtype = [1 2 4 6 8 10]; % bpsk, qpsk, 16, 64,256 and 1024 QAM % r = code rate;
r = [.5 0 0 ;.5 3/4 0; .5 3/4 0; 2/3 3/4 5/6];
ModRateIndex = [1 2 2 3];

% Nsd = number of data tones.
% Nbpscs = number of bits per spatial carrier for stream i for( Nsd = 216:248 ) % loop to sweep the number of Data tones (216:248)
      for( k=1:12 )% loop to sweep Ncol for the Interleaver (1:12)
            for( RowCnt = 6:12 ) % loop to sweep Nrow for the Interleaver (6-12)
                  cnt = [0 0 0 0 0];
                  hit = 1;
                  for( ModCnt = 1:4)
                        Ncbps = Nsd * Modtype(ModCnt); % 1 stream
                        Ndbps = r(ModCnt,ModRateIndex)' * Ncbps;
                        Nbpscs = Ncbps/Nsd;
                        for( RateCnt = 1:ModRateIndex(ModCnt) )
                              tmp = [k RowCnt RateCnt, Nsd, Nbpscs];
                              cnt = [cnt; tmp];
                              INTdim = (RowCnt*Nbpscs) * (18+k);
                              Metric = Ncbps/INTdim;
                              Metric-floor(Metric);
                              if( Metric - floor(Metric) )
                                    cnt = [0 0 0 0 0];
                                    hit = 0;
                                    break
                              elseif( Ndbps(RateCnt)-floor(Ndbps(RateCnt)) )
                                    cnt = [0 0 0 0 0];
                                    hit = 0;
                                    break
                              end
                        end
                  end
                  if( hit )
% fprintf('\n Row = %d, Col = %d, Nsd = %d, NTonesLeft = %d\n', ...
% cnt(end,2), cnt(end,1)+18, Nsd, FFTsize-Nsd);
                        fprintf('\n %4d %4d %4d',cnt(end,2),cnt(end,1)+18);
                  end
            end
      end
end
if( ~hit )
      disp(' No combination found using the following rates and modulations')
end
```

Fig. 3

| $N_{SD}$ | Pilot, DC, Guard Tones (256-SD) | $y$ | $N_{COL}$ |
|---|---|---|---|
| 216 | 40 | 9 | 24 |
| 216 | 40 | 8 | 27 |
| 220 | 36 | 11 | 20 |
| 220 | 36 | 10 | 22 |
| 224 | 32 | 8 | 28 |
| 228 | 28 | 6 | 19 |
| 228 | 28 | 12 | 12 |
| 230 | 26 | 10 | 23 |
| 232 | 24 | 8 | 29 |
| 234 | 22 | 9 | 26 |
| 240 | 16 | 6 | 20 |
| 240 | 16 | 8 | 30 |
| 242 | 14 | 11 | 22 |

Fig. 4

| Modulation | Code Rate | $N_{SD}$ | Pilot, DC, Guard (256-Nsd) | $y$ | $N_{COL}$ |
|---|---|---|---|---|---|
| 256-QAM | 3/4 | 232 | 24 | 8 | 29 |
|  |  | 234 | 22 | 9 | 26 |
| 256-QAM | 5/6 | 234 | 22 | 9 | 26 |
| 256-QAM | 7/8 | 232 | 24 | 8 | 29 |
|  |  | 234 | 22 | 9 | 26 |
| 1024-QAM | 3/4 | 232 | 24 | 8 | 29 |
|  |  | 234 | 22 | 9 | 26 |
| 1024-QAM | 5/6 | 234 | 22 | 9 | 26 |
| 1024-QAM | 7/8 | 232 | 24 | 8 | 29 |
|  |  | 234 | 22 | 9 | 26 |

Fig. 5

MOBILE DEVICE AND METHOD FOR MULTIPLE BANDWIDTH OPERATION WITH TONE COUNT SELECTION

RELATED APPLICATION

This application is a divisional of and claims priority to U.S. patent application Ser. No. 12/655,051, filed on Dec. 22, 2009, and entitled "Tone Count Selection."

BACKGROUND

Orthogonal frequency division multiplexing (OFDM) provides a useful way to modulate data for transmission. OFDM may be considered a form of digital multi-carrier modulation. A large number of orthogonal sub-carriers are used to carry data. Data for transmission is then divided into several parallel data streams for transmission. Each of the sub-carriers may in turn be modulated using binary phase-shift keying (BPSK), quadrature phase-shift keying (QPSK), quadrature amplitude modulation (QAM), and so forth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time-frequency and channel tracking. Guard tones may be inserted between symbols to during transmission to avoid inter-symbol interference (ISI), such as might result from multi-path distortion. These guard tones also help the signal conform to a spectral mask. The nulling of the direct component (DC) may be used to simplify direct conversion receiver designs.

Selecting tone for use within a given OFDM system has proven problematic, particularly when constraints such as reuse of existing OFDM components are included.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

OFDM is used for modulating communications both for wired and wireless devices. As described above, an OFDM system uses selected tones for operation. These tones may be used for data, pilot, guard, DC, and other functions.

Demands for higher capacity communications may result in modifications to OFDM systems to increase capacity. It is beneficial for these modifications to make use of existing code and hardware where possible. For example, in a wireless OFDM system a deployed interleaver/deinterleaver may be re-used in an OFDM system using larger bandwidth with minimal modification. This re-use minimizes development costs and risk associated with new technologies.

Disclosed in this application is a system and techniques suitable for selecting tones for use by an OFDM system, such that existing OFDM components may be leveraged and re-used with minimal or no changes. In one example, a wireless communication system using OFDM with a 40 MHz channel bandwidth may be extended to 80 MHz, increasing the data transmission capacity of the system.

Illustrative Architecture

Figure 1:
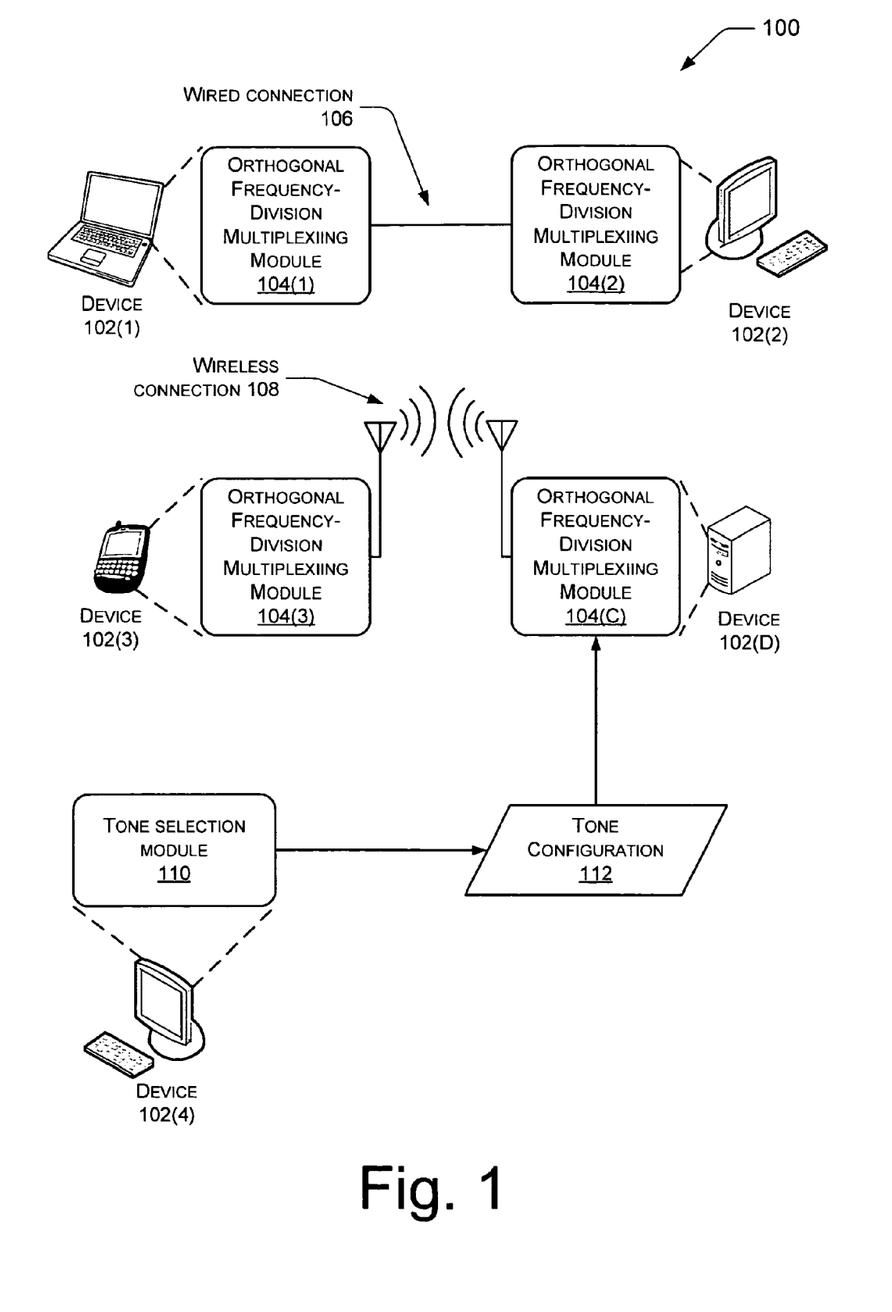
FIG. 1 is an illustrative architecture of a tone selection module and OFDM modules using selected tones.

FIG. 1 is an illustrative architecture 100 of a tone selection module and OFDM modules using the selected tones. A device 102(1) is shown with an orthogonal frequency division multiplexing (OFDM) module 104(1) which is coupled via a wired connection 106 to an OFDM module 104(2) in a device 102(2). OFDM module 104 is configured to generate an OFDM signal. Also shown is a wireless device 102(3) having an OFDM module 104(3) which is wirelessly coupled to OFDM module 104(C) in device 102(D). Each device 102(1)-(D) includes a transmitter, receiver, or transceiver to convey output from one OFDM 104 module to another OFDM module 104. These transmitters, receivers, or transceivers may be configured to convey the output via an electrical conductor, electromagnetic radiation, or both. Each device 102(1)-(D) includes one or more processors (not shown) and a memory (not shown) coupled to the processor. This processor may be configured to execute instructions stored in the memory.

Devices 102(1)-(D) may include wireless access points, radio frequency transceivers, software defined radios, modems, interface cards, cellular telephones, portable media players, desktop computers, laptops, tablet computers, netbooks, personal digital assistants, servers, standalone transceiver interfaces, and so forth.

A tone selection module 110 may be present within device 102(4). Tone selection module 110 generates and may output one or more OFDM tone configurations 112. These tone configurations 112 meet one or more pre-determined constraints. In one implementation, constraints may include ability to re-use an existing interleaver/deinterleaver, specific modulation such as 256-QAM, and so forth. The process utilized by the tone selection module 110 is discussed in more detail below with regards to FIGS. 2 and 3.

Tone configuration 112 may then be implemented within OFDM modules 104(1)-(C) for use in transferring information between two or more devices 102(1)-(D). As described above, the tones in the tone configuration 112 may be selected to facilitate re-use of existing components such as the interleaver/deinterleaver.

Figure 2:
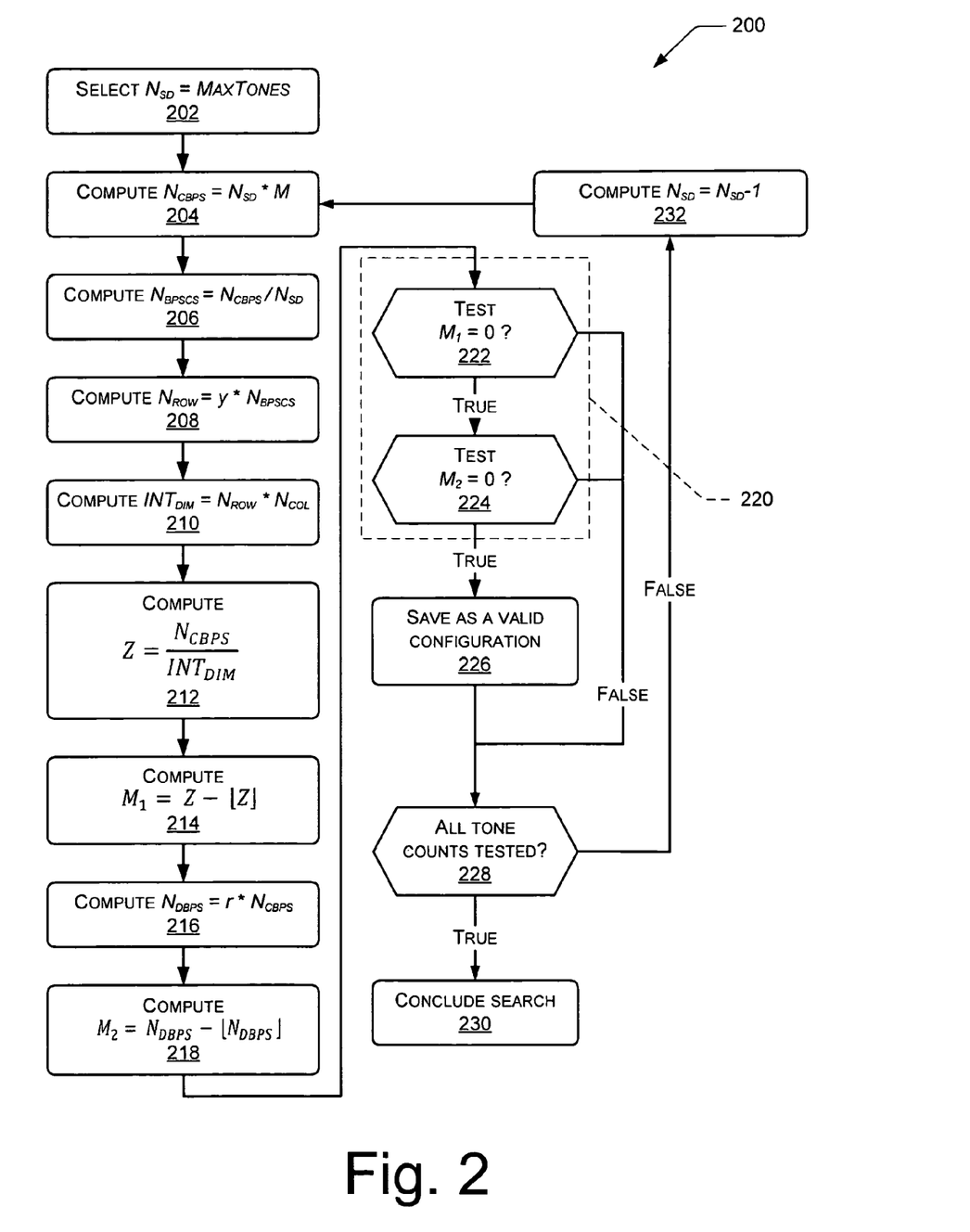
FIG. 2 is a flow chart of a process for selecting tones for use by an OFDM module.

FIG. 2 is a flow chart for an example process 200 for selecting tones with a tone selection module 110. Selected tones may be used by an OFDM module 104. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 202, the tone selection module 110 accepts a selection of a number of data subcarriers $N_{SD}$ to test. $N_{SD}$ may be selected to maintain compatibility with an existing OFDM system. For example, an OFDM system with a 40 MHz channel bandwidth may be modified to 80 MHz channel bandwidth to increase data capacity. For the following examples, assume at least 1 tone is assigned to DC, at least 7 tones will be utilized for guard, and the 40 MHz system uses 108 data tones. Doubling the channel bandwidth from 40 MHz to 80 MHz would double the number of data tones, thus $N_{SD}=2*108=216$ data tones.

At block 204, a number of coded bits per symbol $N_{CBPS}=N_{SD}*M$ is computed where M comprises a modulation order. This modulation order may be used to represent characteristics of the subcarrier modulation. In one implementation, the modulation order may comprise one of the following integer values:

1 for a binary phase-shift keying (BPSK) modulation;
2 for a quadrature phase-shift keying (QPSK) modulation;
4 for quadrature amplitude modulation (QAM) with 16 states (16-QAM);
6 for QAM with 64 states (64-QAM);
8 for QAM with 256 states (256-QAM); or
10 for QAM with 1024 states (1024-QAM).

Continuing the example above, assume BPSK will be assessed initially. Thus, $N_{CBPS}=N_{SD}*M=216*1=216$ coded bits per symbol. At block 206, a number of coded bits per single carrier $N_{BPSCS}=N_{CBPS}/N_{SD}$ is calculated. Continuing the example from above, $N_{BPSCS}=216/216=1$. At block 208, $N_{ROW}=y*N_{BPSCS}$ is computed, where y is an assigned interleaver parameter. Thus, the number of rows in an OFDM interleaver are $y*N_{BPSCS}$. As shown below with regards to table 20-16, in some OFDM systems where y=4, $N_{ROW}=4*N_{BPSCS}$, while in other systems where y=6, $N_{ROW}=6*N_{BPSCS}$, and so forth. Given a specified $N_{ROW}$ and $N_{BPSCS}$, y may be determined.

In an OFDM module 104, an interleaver intersperses constituents of two or more codewords together before transmission on a channel. A deinterleaver reverses this process. In some implementations a modified version of an interleaver used in Institute of Electrical and Electronics Engineers (IEEE) 802.11-compliant OFDM systems may be used. This channel interleaver is defined in section 20.3.11.7.3 of the IEEE P802.11n/D6.0, "Draft Standard for Information Technology-Telecommunications and information exchange between systems Local and metropolitan area networks—Part 11: Wireless LAN Medium Access Control (MAC) and Physical Layer (PHY) specifications." From this text, interleaver parameters from Table 20-16 "Number of Rows and columns in the interleaver" are shown below.

TABLE 20-16

|  | Bandwidth | |
| --- | --- | --- |
|  | 20 MHz | 40 MHz |
| $N_{COL}$ | 13 | 18 |
| $N_{ROW}$ | 4 * $N_{BPSCS}$ | 6 * $N_{BPSCS}$ |
| $N_{ROT}$ | 11 | 29 |

These parameters define the number of coded symbols stored in the interleaver. Continuing the example above for expanding from a 40 MHz channel bandwidth to 80 MHz channel bandwidth, the existing interleaver and associated algorithms may be reused. Such reuse calls for modification of the interleaver to accommodate a matrix defined to write and read data in the OFDM system with the greater channel bandwidth. These parameters include $N_{ROW}$ and $N_{COL}$ which define the number of coded symbols stored in the interleaver. Thus, continuing the example, $N_{ROW}=9*1=9$. In accommodating the larger matrix, $N_{ROT}$ is used to define a rotation of values when more than one spatial stream exists. $N_{ROT}$ may be ignored because it does not define the interleaver size and thus does not affect tone selection.

Figure 4:
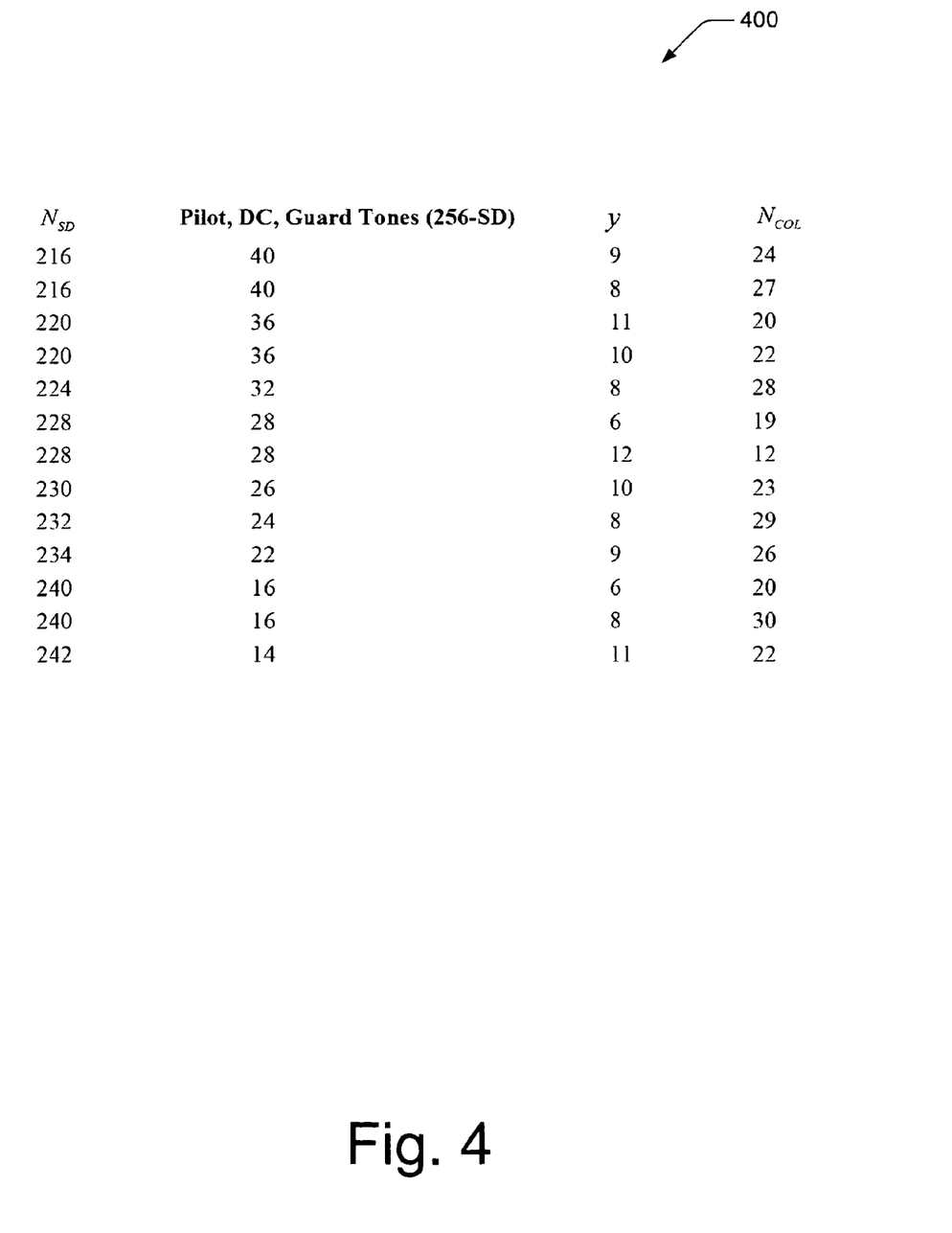
FIG. 4 is a table of illustrative possible configurations for an OFDM system having an 80 MHz bandwidth.

At block 210, $INT_{DM}=N_{ROW}*N_{COL}$ is computed. In this example, assuming $N_{COL}=24$ (as shown below with regards to FIG. 4) then $INT_{DIM}=9*24=216$. At block $$Z = \frac{N_{CBPS}}{INT_{DIM}}$$

is computed. In this example, $Z=216/216=1$.

At block 214, $M_1=Z-\lfloor Z \rfloor$ is computed. Continuing the example, $Z=1-1=0$. At block 216, a number of data bits per symbol $N_{DBPS}=r*N_{CBPS}$, where r is a code rate, is computed. Code rate indicates the portion of non-redundant information present when data is encoded. For this example, assume a code rate of ½, indicating that half of the data actually transmitted is non-redundant, while the other half is redundant such as may be included due to error correction protocols. Thus, $N_{DBPS}=\frac{1}{2}*216=153$. At block 218, $M_2=N_{DBPS}-\lfloor N_{DBPS} \rfloor$ In this example, $M_2=153-\lfloor 153 \rfloor=0$.

Certain tone selections may fail to work properly with certain modulation techniques. Thus, it may be useful to test configurations to confirm a particular combination of code rate and modulation is valid. A particular combination may be considered valid when that combination will function using an existing or minimally extended OFDM component, such as an interleaver. In other words, will a particular combination of code rate and modulation work with a given tone selection? For example, in some OFDM systems, non-integer numbers of bits cannot be processed due to the mapping done in encoding, modulation. It is possible with certain selections of coding, modulation and tone selection that the test at block 214 passes, but the result is a non-integer number for $N_{DBPS}$ results. An information bit must be a full bit, as OFDM cannot encode information in a partial bit. In some implementations, bit padding may be used to take non-integer numbers of bits and add additional bits to produce an output with an integer number of bits.

When bit padding is not in use, the constraints as shown within the dotted line at 220 may be used to limit output of tone selections to those which have integer numbers of bits. This may also limit code rates which are available. For example, using 256-QAM, code rates of 23 and 56 may not be available without extensive modification to existing OFDM systems. Such modification may render the resulting OFDM system incompatible with prior OFDM systems.

At block 222, a test is performed to determine if $M_1=0$. When this test is true, block 224 tests to determine if $M_2=0$. As mentioned above, in some implementations where bit padding is available, or these constraints shown within 220 otherwise do not apply, they may be omitted. Continuing the above example, $M_1=0$ and $M_2=0$, therefore the configuration is valid. When block 222 or 224 result in a false output, the process may continue to block 228 below to determine if all tone counts have been tested.

At block 226, a resulting tone selection may be saved as a valid configuration. The previous acts may be looped until all available tone counts are tested. At block 228, when all tone counts have been tested, the process then proceeds to block 230 and the search concludes. Results from this process may then be stored to computer-readable storage media, presented to a user, and so forth.

When block 228 determines tone counts remain to be tested, at block 232 $N_{SD}=N_{SD}-1$ is computed. The results may be returned to block 204 for the process to continue until all tone counts have been tested.

Figure 3:
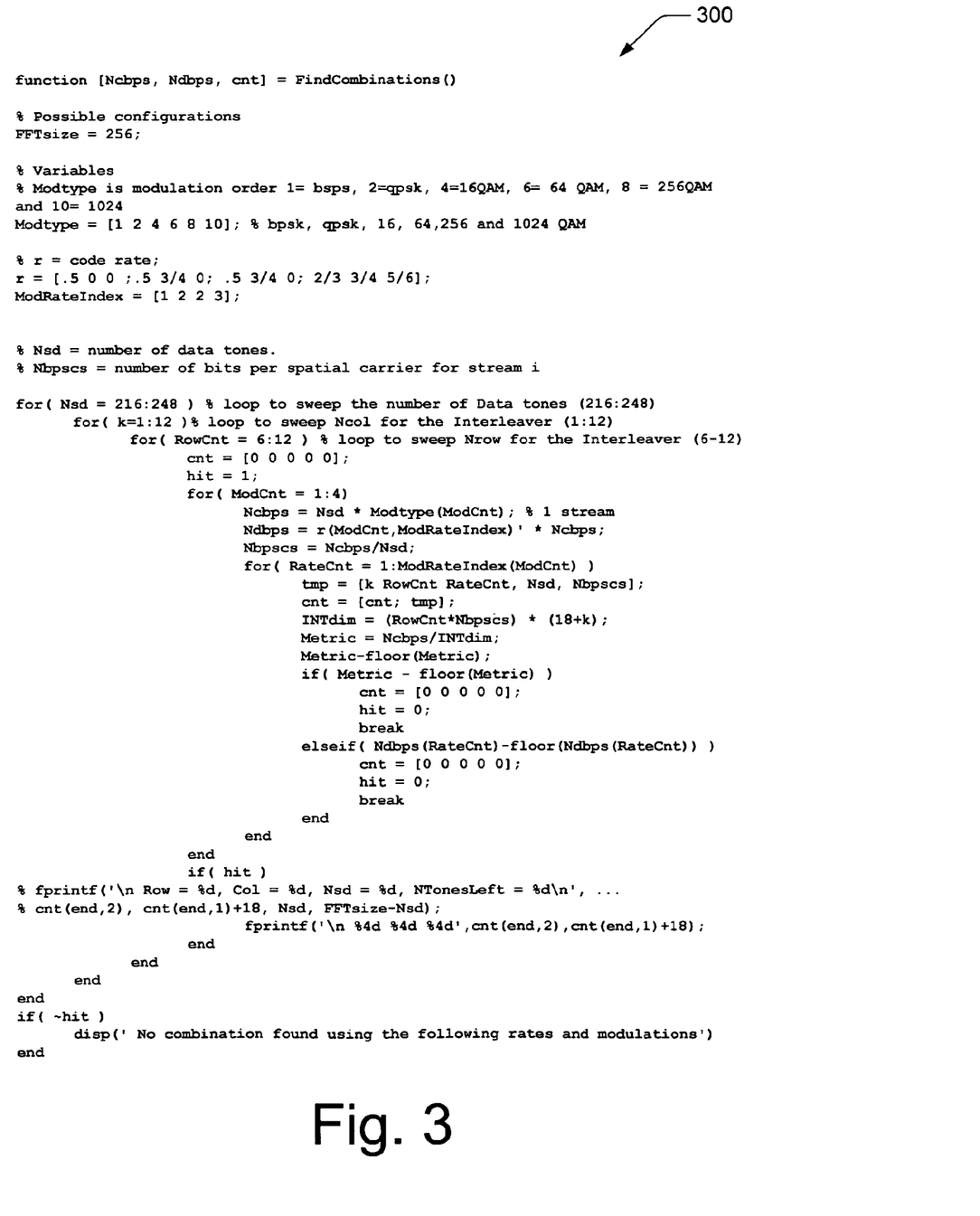
FIG. 3 is an example script for selecting tones for use by an OFDM module.

FIG. 3 is an example script for selecting tones for use by the OFDM module 104. This script is written for use with the MATLAB simulation tool for one implementation of a tone count selection module 110. MATLAB is a product of The MathWorks Inc. of Natick, Mass. This script is provided as an example, not as a limitation.

Within this script, the process iterates over a set of possible data tones in the range of 216 to 248. The 216 value was chosen as described above. Legacy OFDM systems used a total of 64 tones in conjunction with a 20 MHz channel bandwidth, and 128 tones in conjunction with a 40 MHz channel bandwidth. In order to reuse the same tone spacing of the legacy systems and thus maximize reuse of hardware and software, an 80 MHz channel bandwidth system would use 256 tones. Given this constraint of 256 tones, 248 is chosen because with 256 tones total, only 8 tones would be available for other uses including pilot, guard, and DC. Given that 8 tones may be impractically limiting for an OFDM system, 248 was selected in this example as an upper bound.

Next, an inner loop iterates over the $N_{COL}$ interleaver dimension. In this example, this loop iterates from 1 to 12, which maps a column size of 18 to 30 in an interleaver. In a wireless protocol defined by specification IEEE 802.11, the column size was 13 for 20 MHz bandwidth and 18 for 40 MHz bandwidth, thus a range of 18 to 30 is appropriate for an OFDM system having an 80 MHz bandwidth.

The next inner loop is for the $N_{ROW}$ count, which is allowed to run from 6 to 12 in this example. In the wireless protocol defined by specification IEEE 802.11, the row multiplier is 4 for 20 MHz, 6 for 40 MHz, thus a range of 6 to 12 is appropriate for 80 MHz. The next two inner loops are for the modulation and code rate. The code rate may be selected based on the modulation type.

FIG. 4 is a table of illustrative possible configurations 400 generated using the script of FIG. 3 for an OFDM system having an 80 MHz bandwidth. In some implementations, these tone configurations 112 may be applied to a wireless networking protocol using OFDM, including but not limited to those related to the IEEE 802.11 standard. In generating this table of configurations 400 the following assumptions were made of an 80 MHz bandwidth OFDM system having tone spacing, modulation, and coding rates present in existing systems. These constraints are included to maximize reuse of software and hardware designs, and may also provide an avenue for backward compatibility.

Based on this configuration and assuming no changes in the 80 MHz system for coding or modulation, several configurations shown at 400 are possible. In one implementation, the same tone assignment for the guard tones, pilot tones, and DC as in a 40 MHz system may be used. For example, in the 40 MHz system there are 11 guard, 6 pilot, and 3 DC tones, for a total of 20 tones. Therefore, data tone assignments larger than 256−20=236 are not available.

In another implementation, a 234 data tone configuration may be suitable. This configuration allows an additional 2 tones to be allocated to pilot, guard, or other use. In another implementation, 232 tones may be allocated, which would provide 4 additional tones for pilot or guard functions.

Figure 5:
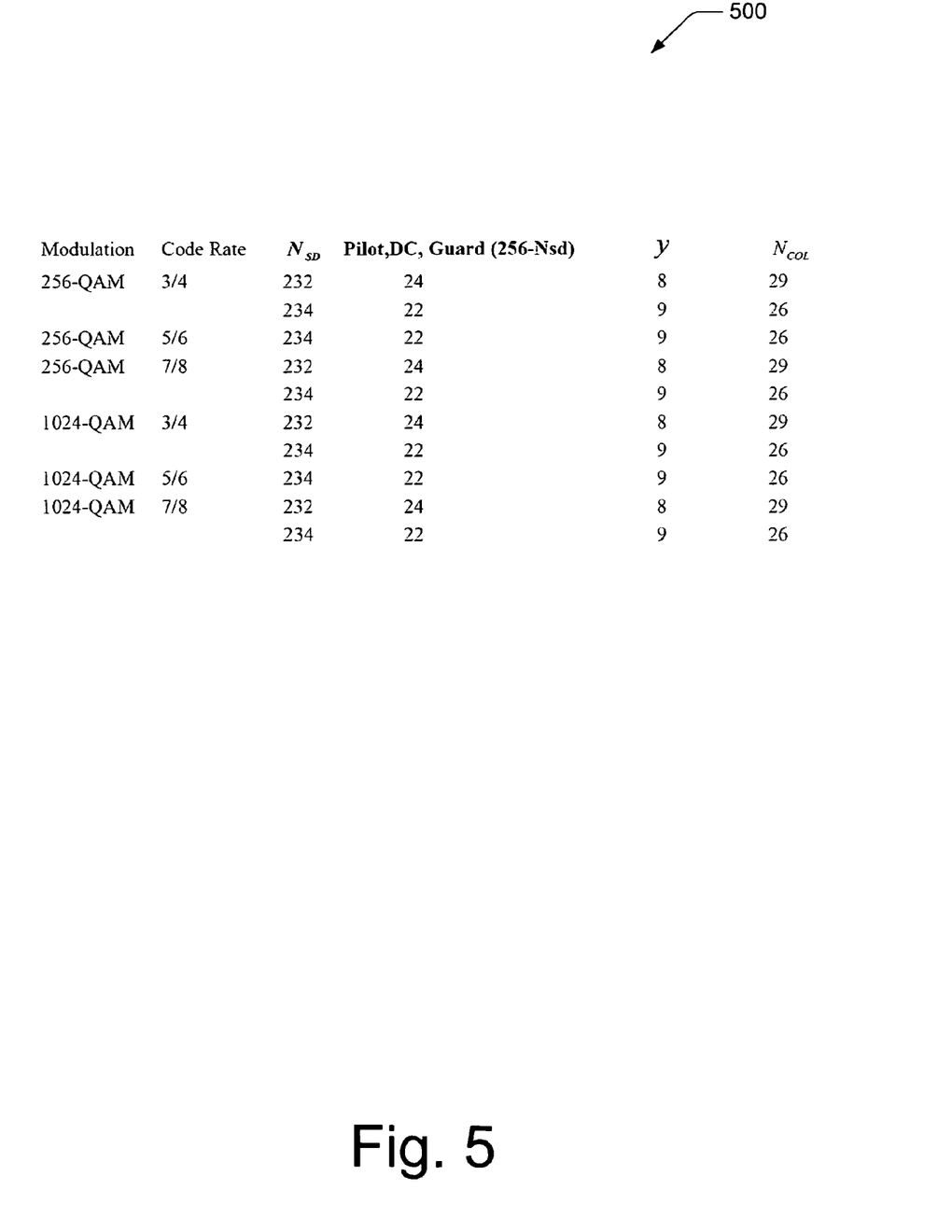
FIG. 5 is a table of possible allocations for new modulation and coding types, based on a portion of the possible configurations of FIG. 4.

FIG. 5 is a table 500 of possible tone configurations based on a portion of the possible configurations of FIG. 3. In a wireless networking system, additional code rates and modulation types may be included to increase peak data rates. In the table 500, a 256 state QAM modulation and a 1024 state QAM as well as a code rate of r=7/8 have been introduced.

Given the 256-QAM and 1024-QAM and a code rate r=7/8, the process of FIG. 2 as implemented by the script of FIG. 3 may be used to determine possible tone configurations 112. The configurations of the table 500 are focused on tone counts under the 236 tone count arrived above, and above a tone count of 230. When $N_{SD}$=234 all code rates 3/4, 5/6, and 7/8 are available, providing flexibility in selection. In comparison, when $N_{SD}$=232 only the 3/4 and 7/8 code rates are supported.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solidstate memory technology, compact disk read-only memory (CD-ROM), digital versatile disks (DVD) or other optical disk storage, magnetic disk storage or other magnetic storage devices, or any other medium which can be used to store the desired information and which can be accessed by a computing device.

What is claimed is:

1. A method performed by a communication device configured for multiple bandwidth operation, the communication device configurable to operate in each of a plurality of channel bandwidths, the channel bandwidths including at least a 20 MHz, a 40 MHz, and an 80 MHz bandwidth, the method comprising:

selecting a total data tone count $N_{SD}$ for modulating a data payload in accordance with an orthogonal frequency division multiplexing (OFDM) technique for transmission over an identified one of the channel bandwidths, the total data tone count selected from a plurality of total data tone counts for the identified channel bandwidth; and interleaving two or more codewords in the data payload before transmission on a channel of the identified channel bandwidth, wherein a channel coding rate and a modulation level are selected based on the selected total data tone count for interleaving integer numbers of bits in accordance with one of a plurality of predetermined interleaver configurations.

2. A method performed by a communication device configured for multiple bandwidth operation, the communication device configurable to operate in each of a plurality of channel bandwidths, the channel bandwidths including at least a 20 MHz, a 40 MHz, and an 80 MHz bandwidth, the method comprising:

selecting a total data tone count $N_{SD}$ for modulating a data payload in accordance with an orthogonal frequency division multiplexing (OFDM) technique for transmission over an identified one of the channel bandwidths, the total data tone count selected from a plurality of total data tone counts for the identified channel bandwidth;

interleaving two or more codewords in the data payload before transmission on a channel of the identified channel bandwidth; and selecting a channel coding rate and modulation level for the total data tone count selected for the identified channel bandwidth, the channel coding rate, the modulation level and the total data tone count being compatible for an interleaver configured to perform the interleaving.

3. The method of claim 2 wherein prior to interleaving, the method includes verifying dimensions of an interleaver, the dimensions including a number of columns and number of rows, the number of rows based on a row multiplier, and wherein verifying the dimensions of the interleaver is based on the channel coding rate and modulation level for the total data tone count selected for the identified channel bandwidth to provide processing for an integer number of bits.

4. The method of claim 2 wherein for a channel bandwidth of 80 MHz and wherein for a modulation level of 256-QAM and a channel coding rate of 3/4, a modulation level of 256-QAM with a channel coding rate of 7/8, a modulation level of 1024-QAM with a channel coding rate of 3/4, and for a modulation level of 1024-QAM with a channel coding rate of 7/8:

the total data tone count is 232 with 24 additional tones allocated to pilot, guard and DC, and the interleaver is configured with 29 columns and a number of rows based on a row multiplier of 8.

5. The method of claim 2 wherein for a channel bandwidth of 80 MHz and for a modulation level of 256-QAM and a channel coding rate of 3/4, a modulation level of 256-QAM with a channel coding rate of 5/6, a modulation level of 256-QAM with a channel coding rate of 7/8, a modulation level of 1024-QAM with a channel coding rate of 3/4, a modulation level of 1024-QAM with a channel coding rate 5/6, and a modulation level of 1024-QAM with a channel coding rate of 7/8:

the total data tone count is 234 with 22 additional tones allocated to pilot, guard and DC, and the interleaver is configured with 26 columns and a number of rows based on a row multiplier of 9.

6. The method of claim 5 wherein the channel bandwidths include predetermined channel bandwidths less than 20 MHz and a channel bandwidth of 160 MHz.

7. The method of claim 6 further comprising reducing a tone-spacing for predetermined channel bandwidths less than 20 MHz.

8. The method of claim 5 further comprising communicating over the identified channel bandwidth with an access point in accordance with a technique using the selected channel coding rate and modulation level for the total data tone count selected for the identified channel bandwidth.

9. The method of claim 5 further comprising performing direct device-to-device communications over the identified channel bandwidth with another communication device in accordance with a technique using the selected channel coding rate and modulation level for the total data tone count selected for the identified channel bandwidth.

10. A mobile communication device configured for multiple bandwidth operation, the communication device configurable to operate in each of a plurality of channel bandwidths, the channel bandwidths including at least a 20 MHz, a 40 MHz, and an 80 MHz bandwidth, the mobile communication device comprising:

processing circuitry to select a total data tone count $N_{SD}$ for modulating a data payload in accordance with an orthogonal frequency division multiplexing (OFDM) technique for transmission over an identified one of the channel bandwidths, the total data tone count selected from a plurality of total data tone counts for the identified channel bandwidth; and an interleaver to interleave two or more codewords in the data payload before transmission over a channel of the identified channel bandwidth, wherein a channel coding rate and a modulation level are selected based on the selected total data tone count for interleaving integer numbers of bits in accordance with one of a plurality of predetermined interleaver configurations.

11. A mobile communication device configured for multiple bandwidth operation, the communication device configurable to operate in each of a plurality of channel bandwidths, the channel bandwidths including at least a 20 MHz, a 40 MHz, and an 80 MHz bandwidth, the mobile communication device comprising:

hardware processing circuitry to select a total data tone count $N_{SD}$ for modulating a data payload in accordance with an orthogonal frequency division multiplexing (OFDM) technique for transmission over an identified one of the channel bandwidths, the total data tone count selected from a plurality of total data tone counts for the identified channel bandwidth;

an interleaver to interleave two or more codewords in the data payload before transmission over a channel of the identified channel bandwidth; and wherein the hardware processing circuitry is further configured to select a channel coding rate and modulation level for the total data tone count selected for the identified channel bandwidth, the channel coding rate, the modulation level and the total data tone count being compatible for an interleaver configured to interleave the two or more codewords.

12. The mobile communication device of claim 11 wherein the hardware processing circuitry is configured to verify dimensions of the interleaver, the dimensions including a number of columns and number of rows, the number of rows based on a row multiplier, and wherein hardware processing circuitry is configured to verify the dimensions of the interleaver based on the channel coding rate and modulation level for the total data tone count selected for the identified channel bandwidth to process an integer number of bits.

13. The mobile communication device of claim 11 wherein for a channel bandwidth of 80 MHz and for a modulation level of 256-QAM and a channel coding rate of 3/4, a modulation level of 256-QAM with a channel coding rate of 7/8, a modulation level of 1024-QAM with a channel coding rate of 3/4, and for a modulation level of 1024-QAM with a channel coding rate of 7/8:

the total data tone count is 232 with 24 additional tones allocated to pilot, guard and DC, and the interleaver is configured with 29 columns and a number of rows based on a row multiplier of 8.

14. The mobile communication device of claim 11 wherein: for a channel bandwidth of 80 MHz and for a modulation level of 256-QAM and a channel coding rate of 3/4, a modulation level of 256-QAM with a channel coding rate of 5/6, a modulation level of 256-QAM with a channel coding rate of 7/8, a modulation level of 1024-QAM with a channel coding rate of 3/4, a modulation level of 1024-QAM with a channel coding rate 5/6, and a modulation level of 1024-QAM with a channel coding rate of 7/8:
the total data tone count is 234 with 22 additional tones allocated to pilot, guard and DC, and the interleaver is configured with 26 columns and a number of rows based on a row multiplier of 9.

15. The mobile communication device of claim 14 wherein the channel bandwidths include predetermined channel bandwidths less than 20 MHz and a channel bandwidth of 160 MHz.

16. The mobile communication device of claim 15 wherein a tone-spacing is reduced for predetermined channel bandwidths less than 20 MHz.

17. The mobile communication device of claim 14 wherein the mobile communication device is configured to communicate over the identified channel bandwidth with an access point in accordance with a technique using the selected channel coding rate and modulation level for the total data tone count selected for the identified channel bandwidth.

18. The mobile communication device of claim 14 wherein the mobile communication device is configured to perform direct device-to-device communications over the identified channel bandwidth with another communication device in accordance with a technique using the selected channel coding rate and modulation level for the total data tone count selected for the identified channel bandwidth.

19. The mobile communication device of claim 14 further comprising an antenna coupled to the hardware processing circuitry.

20. A mobile communication device configured for multiple bandwidth operation, the communication device configurable to operate in each of a plurality of channel bandwidths, the channel bandwidths including at least a 20 MHz, a 40 MHz, and an 80 MHz bandwidth, the communication device comprising:
processing circuitry to configure a data payload in accordance with an orthogonal frequency division multiplexing (OFDM) technique for modulation and transmission over an identified one of the channel bandwidths based on a total data tone count $N_{SD}$ for the identified channel bandwidth; and
an interleaver to interleave two or more codewords in the data payload before transmission over a channel of the identified channel bandwidth,
wherein for a channel bandwidth of 80 MHz and for a modulation level of 256-QAM and a channel coding rate of 3/4, a modulation level of 256-QAM with a channel coding rate of 5/6, a modulation level of 256-QAM with a channel coding rate of 7/8, a modulation level of 1024-QAM with a channel coding rate of 3/4, a modulation level of 1024-QAM with a channel coding rate 5/6, and a modulation level of 1024-QAM with a channel coding rate of 7/8, the total data tone count is 234 with 22 additional tones allocated to pilot, guard and DC, and an interleaver is configured with 26 columns and a number of rows based on a row multiplier of 9.

21. The mobile communication device of claim 20 further comprising an antenna coupled to the processing circuitry.

22. A non-transitory computer-readable storage medium that stores instructions for execution by one or more processors of a mobile communication device to configure the device for multiple bandwidth operation, the communication device configurable to operate in each of a plurality of channel bandwidths, the channel bandwidths including at least a 20 MHz, a 40 MHz, and an 80 MHz bandwidth, the instructions configuring the device to:
configure a data payload in accordance with an orthogonal frequency division multiplexing (OFDM) technique for modulation and transmission over an identified one of the channel bandwidths based on a total data tone count $N_{SD}$ for the identified channel bandwidth; and
interleave two or more codewords in the data payload before transmission over a channel of the identified channel bandwidth,
wherein a channel coding rate and a modulation level are selected based on the selected total data tone count for interleaving integer numbers of bits in accordance with one of a plurality of predetermined interleaver configurations.

23. A non-transitory computer-readable storage medium that stores instructions for execution by one or more processors of a mobile communication device to configure the device for multiple bandwidth operation, the communication device configurable to operate in each of a plurality of channel bandwidths, the channel bandwidths including at least a 20 MHz, a 40 MHz, and an 80 MHz bandwidth, the instructions to configured communication device to:
configure a data payload in accordance with an orthogonal frequency division multiplexing (OFDM) technique for modulation and transmission over an identified one of the channel bandwidths based on a total data tone count $N_{SD}$ for the identified channel bandwidth; and
interleave two or more codewords in the data payload before transmission over a channel of the identified channel bandwidth,
wherein:
for a channel bandwidth of 80 MHz, and
for a modulation level of 256-QAM and a channel coding rate of 3/4, a modulation level of 256-QAM with a channel coding rate of 5/6, a modulation level of 256-QAM with a channel coding rate of 7/8, a modulation level of 1024-QAM with a channel coding rate of 3/4, a modulation level of 1024-QAM with a channel coding rate 5/6, and a modulation level of 1024-QAM with a channel coding rate of 7/8:
the total data tone count is 234 with 22 additional tones allocated to pilot, guard and DC, and the interleaver is configured with 26 columns and a number of rows based on a row multiplier of 9.

* * * * *